US008825906B2

(12) United States Patent
Banatwala et al.

(10) Patent No.: US 8,825,906 B2
(45) Date of Patent: Sep. 2, 2014

(54) METHOD AND SYSTEM FOR NAMED COLLABORATIVE SPACES IN A COLLABORATIVE COMPUTING ENVIRONMENT

(75) Inventors: Mustansir M. Banatwala, Hudson, NH (US); Miguel A. Estrada, Hollis, NH (US); Joseph A. Russo, Westford, MA (US); Sami M. Shalabi, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 10/734,348

(22) Filed: Dec. 12, 2003

(65) Prior Publication Data

US 2005/0144250 A1 Jun. 30, 2005

(51) Int. Cl.
*G06F 15/16* (2006.01)
*G06Q 10/10* (2012.01)

(52) U.S. Cl.
CPC ..................................... *G06Q 10/10* (2013.01)
USPC ............ 709/250; 709/203; 709/204; 709/215

(58) Field of Classification Search
USPC .................. 709/215, 218, 229, 244, 203, 204
See application file for complete search history.

(56) References Cited

U.S. PATENT DOCUMENTS

| | | | | | |
|---|---|---|---|---|---|
| 5,008,853 | A | * | 4/1991 | Bly et al. ....................... | 715/751 |
| 5,247,615 | A | * | 9/1993 | Mori et al. ..................... | 709/205 |
| 5,446,842 | A | * | 8/1995 | Schaeffer et al. ............. | 709/205 |
| 5,583,993 | A | * | 12/1996 | Foster et al. ................... | 709/205 |
| 5,634,129 | A | * | 5/1997 | Dickinson ..................... | 719/315 |
| 6,058,416 | A | * | 5/2000 | Mukherjee et al. ........... | 709/203 |
| 6,195,685 | B1 | * | 2/2001 | Mukherjee et al. ........... | 709/205 |
| 6,321,252 | B1 | * | 11/2001 | Bhola et al. ................... | 709/204 |
| 6,401,101 | B1 | * | 6/2002 | Britton et al. ........................ | 1/1 |
| 6,850,967 | B1 | * | 2/2005 | Spencer et al. ............... | 709/205 |
| 6,901,448 | B2 | * | 5/2005 | Zhu et al. ....................... | 709/228 |
| 6,952,660 | B1 | * | 10/2005 | Matheson .......................... | 703/1 |
| 6,996,780 | B2 | * | 2/2006 | Estrada ........................... | 715/751 |
| 7,035,944 | B2 | * | 4/2006 | Fletcher et al. ............... | 709/250 |
| 7,051,071 | B2 | * | 5/2006 | Stewart et al. ................ | 709/204 |
| 7,051,072 | B2 | * | 5/2006 | Stewart et al. ................ | 709/204 |
| 7,266,600 | B2 | * | 9/2007 | Fletcher et al. ............... | 709/223 |
| 7,281,060 | B2 | * | 10/2007 | Hofmann et al. ............. | 709/246 |
| 7,343,428 | B2 | * | 3/2008 | Fletcher et al. ............... | 709/250 |
| 7,472,342 | B2 | * | 12/2008 | Haut et al. ..................... | 715/234 |
| 7,937,500 | B2 | * | 5/2011 | Fletcher et al. ............... | 709/250 |
| 8,260,844 | B2 | * | 9/2012 | Timmons ....................... | 709/203 |
| 8,335,862 | B2 | * | 12/2012 | Fletcher et al. ............... | 709/250 |
| 8,589,594 | B2 | * | 11/2013 | Fletcher et al. ............... | 709/250 |
| 2001/0025299 | A1 | * | 9/2001 | Chang et al. .................. | 709/204 |
| 2001/0029501 | A1 | * | 10/2001 | Yokobori et al. ................ | 707/10 |
| 2001/0037364 | A1 | * | 11/2001 | Michalek et al. ............. | 709/204 |
| 2002/0075303 | A1 | * | 6/2002 | Thompson et al. ........... | 345/751 |
| 2002/0095355 | A1 | * | 7/2002 | Walker et al. ................... | 705/26 |

(Continued)

*Primary Examiner* — Backhean Tiv
(74) *Attorney, Agent, or Firm* — Steven M. Greenberg, Esq.; CRGO Law

(57) ABSTRACT

A method and system for the establishment of a named collaborative space in a collaborative computing environment in which a named space defining a place within the collaborative computing environment is provided. A membership set for the collaborative space is identified in which the membership set includes one or more members. At least one business process accessible within the named space is provided. The at least one business process can provide a business component instance which provides a specific business function within the named space. The business component instance can be in the form of a portlet.

16 Claims, 2 Drawing Sheets

(56) References Cited

U.S. PATENT DOCUMENTS

| | | |
|---|---|---|
| 2002/0149618 A1* | 10/2002 | Estrada et al. ............... 345/760 |
| 2003/0055878 A1* | 3/2003 | Fletcher et al. ............. 709/203 |
| 2003/0110448 A1* | 6/2003 | Haut et al. .................... 715/513 |
| 2004/0003044 A1* | 1/2004 | Teoh et al. ................... 709/205 |
| 2004/0103118 A1* | 5/2004 | Irving et al. ............... 707/104.1 |
| 2004/0107249 A1* | 6/2004 | Moser et al. ................. 709/204 |
| 2004/0107256 A1* | 6/2004 | Odenwald et al. ............ 709/205 |
| 2005/0033622 A1* | 2/2005 | Kuo et al. ........................ 705/8 |
| 2005/0060371 A1* | 3/2005 | Cohen et al. ................. 709/205 |
| 2005/0114475 A1* | 5/2005 | Chang et al. ................. 709/220 |
| 2005/0144250 A1* | 6/2005 | Banatwala et al. ........... 709/215 |
| 2005/0160084 A1* | 7/2005 | Barrett ............................. 707/3 |
| 2005/0204297 A1* | 9/2005 | Banatwala et al. ........... 715/753 |
| 2006/0036682 A1* | 2/2006 | Fletcher et al. .............. 709/203 |
| 2012/0331044 A1* | 12/2012 | Timmons ..................... 709/203 |

\* cited by examiner

METHOD AND SYSTEM FOR NAMED COLLABORATIVE SPACES IN A COLLABORATIVE COMPUTING ENVIRONMENT

BACKGROUND OF THE INVENTION

1. Statement of the Technical Field

The present invention relates to the field of collaborative computing and more particularly to a model that facilitates collaborative computing system development.

2. Description of the Related Art

Collaborative computing provides a means for users to pool their strengths and experiences to achieve a common goal. For example, a common goal may be an educational objective, the completion of a software development project or even creation and use of a system to manage human resources. A collaborative computing environment is defined by (1) a particular context, i.e. the objective of the environment, (2) membership, i.e., the participants in the environment, and (3) a set of roles for the members. Roles are names given to the people in the environment which dictate access to the resources and tools within the environment as well as define the behavior of the community members.

Collaborative computing environments are customized to meet the developers' and users' needs. For example, customized collaborative computing environments such as team workspaces, emeetings, virtual classrooms and communities are known. Each of these types of environments is implemented using shared resources as a building block to create the environment. Shared resources for all environments have general characteristics such as a purpose/title, and the premise that they can be created, deleted, cloned, renamed, expired, archived and restored, etc. Shared resources may also be customized to fulfill the objectives of the environment. For example, virtual classrooms employ the general characteristics of the shared resources but further specialize the shared resources in the areas of defining membership roles, e.g., teacher, student, etc., the definition of content, e.g., courses, and provide a shared resource directory customized in the form of a list of courses.

Current customized collaborative computing environments must each be developed and configured individually, that is, each instance of a collaborative computing environment can only be of one customized type, e.g., a virtual classroom. As such, present systems require that each separate computing environment be developed from the ground up, even though the separate environments may have the need for common business processes, e.g., stock quotations, web conferencing interface, news, etc. Put another way, known collaborative computing systems do not provide a way to create an environment in which arbitrary business process objects can be placed and customized to fit the needs of the desired environment.

The result is collaborative computing environments which are customized and not readily usable as a way to build future environments. It is desirable to have a method and system which provides a collaborative computing environment framework that can be specialized into collaborative computing environment applications in a matter that allows for templatable and provisionable specialized applications. As such, it is also desirable to have a collaborative computing system and method which facilitates the binding of people to tools and resources in a named addressable space by providing a framework for development thereof.

SUMMARY OF THE INVENTION

The present invention addresses the deficiencies of the art in respect to the modeling and creation of collaborative computing spaces and provides a novel and non-obvious method and system for modeling and providing named collaborative spaces in a collaborative computing environment.

Methods consistent with the present invention provide a collaborative computing method for the establishment of a named collaborative space in which a named space defining a work place within the collaborative computing environment is provided. A membership set for the collaborative space is identified in which the membership set includes one or more members. At least one business process accessible within the named space is provided.

Systems consistent with the present invention include a system providing a named collaborative space in a collaborative computing environment, in which the system includes a computer having a database and a central processing unit. The database stores a membership set for the collaborative space identifying one or more members and data corresponding to a named space defining a work place within the collaborative computing environment. The central processing unit functions to provide at least one business process accessible within the named space. The central processing unit is in operative communication with the database.

According to another aspect, the present invention provides a computer-readable storage medium storing a computer program which when executed performs a method for establishing a collaborative computing named collaborative space in which a named space defining a work place within the collaborative computing environment is provided. A membership set for the collaborative space is stored in which the membership set identifies one or more members. At least one business process accessible within the named space is provided.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is method and system for the establishment of a named collaborative space (referred to herein as "NCS") in a collaborative computing environment. The present invention provides a templatable and provisionable approach to facilitate the deployment of collaborative computing environments and places. Templatable as used herein refers to the ability of a collaborative computing community developer or user to create a named collaborative space which can serve as a model for other named spaces. Deploying subsequent named spaces using the method and system of the present invention involves merely calling up an existing template and arranging it to fit the needs of the community. Provisionable as used herein refers to the ability of a collaborative computing community developer or user to base a named collaborative space on a previous named space in a manner which may require little or no customization.

Figure 1:
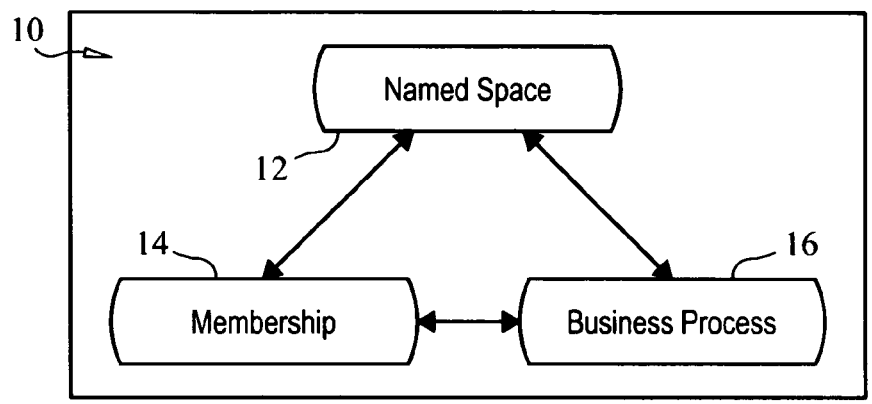
FIG. 1 is a block diagram of a named collaborative space constructed in accordance with the principles of the present invention.

Referring now to the drawing figures in which like reference designators refer to like elements, there is shown in FIG. 1 a block diagram of a named collaborative space constructed in accordance with the principles of the present invention and referred to generally as '10'. Named collaborative space 10 includes named space 12, membership 14 and business process 16, each of which interoperate with each other to provide the framework for NCS 10.

As such NCS 10 defines a secure named instance of a collaborative business process. Named space 12 refers to the community place (also referred to herein as work place) within which the membership and processes exist. In other words, a named space 12 can be a portal place within a collaborative computing environment.

Membership 14 refers to the people within the named collaborative space, i.e. the users of business processes 16 within named space 12. Business process 16 is implemented as one or more business component instances within named space 12. Business component instances provide the tools and resources used by membership 14. Examples of tools provided by business component instances include stock tickers, search engines, discussion forums, document libraries, meeting schedulers, etc.

Business component instances provided as part of business process 16 are managed by a specific NCS 10 instance. Although not required, business component instances can share the same life cycle as its corresponding NCS instance. In other words when an NCS 10 is instantiated, a business component instance is also instantiated. When an NCS instance is removed, the business component instance is also removed. The underlying NCS communicates with business components via a predefined interface. For example, such an interface may be an enterprise java bean ("EJB") or other type of server object that can be called such as remotable application program interfaces.

For example, a business component instance can be represented by a portlet, business logic and the underlying content. As used herein the term "portlet" refers to a java-based web component, managed by a portlet container, that processes requests and generates dynamic content. For example, web portals use portlets as pluggable user interface components that provide a presentation layer to information systems. As discussed below, portlets provide a separate window interface to an application within a larger group of interfaces. In other words, a portlet is used to visualize a business component instance.

Figure 2:
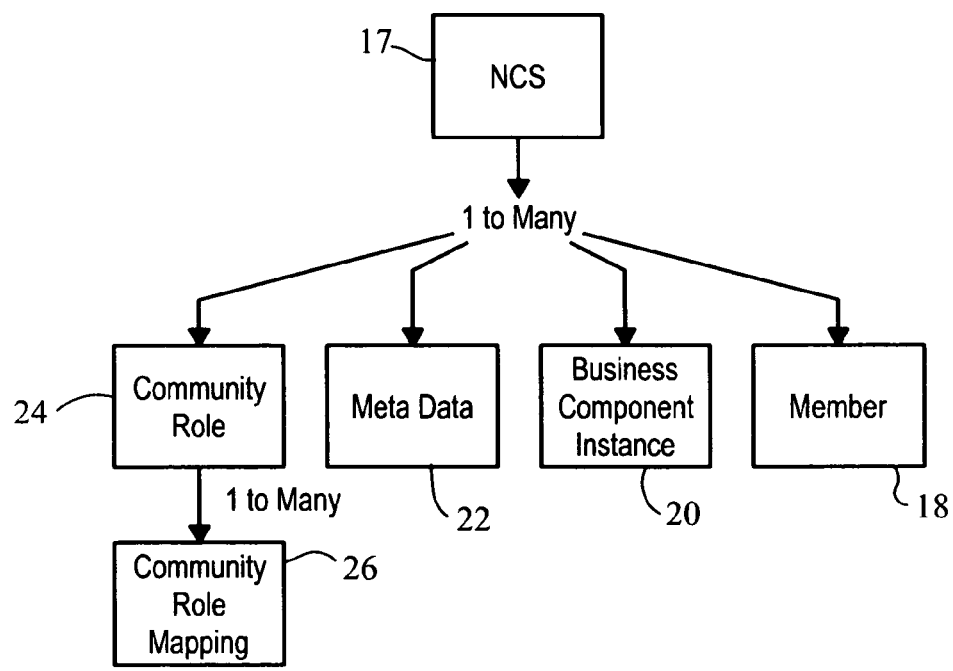
FIG. 2 is a block diagram of a data model showing the relationship between a named collaborative space and other collaborative community components

The relationship between NCS 10 and other objects within a named collaborative space instance is described with respect to FIG. 2. As shown in FIG. 2, NCS object 17 has a 1 to many relationships with member objects 18, business component instances 20, metadata objects 22 and community role objects 24. Community role objects 24 likewise have a 1 to many relationships with community role mapping objects 26.

NCS object 17 includes as elements a global unique identifier (GUID), a name, a type, a boolean indicator as to whether the instantiation is a template, a portal place ID identifying the named space 12 for the NCS as well as other information defining size, creation dates, times, modification tracking, etc.

Member object 18 identifies and relates members to a particular named collaborative space 10 as well as a community role. Community roles are discussed below in detail.

Business component instance object 20 includes as elements a GUID, a reference back to the GUID for the NCS instance, the name of the business component, the type of business component, an ID for the business component, a portlet ID, if applicable, as well as an ID indicating which portal page the business component is associated with, i.e. the named space.

Metadata object 22 provides the ability to add and define additional properties of an NCS and includes as elements a name, a reference back to the GUIO for the NCS instance, a type, a value integer, a value date, and a value string. The metadata provides information about the NCS instance such as the moderator, intent of the NCS instance, and general information. As such, metadata object 22 type indicates the type of metadata, the value integer, date, and string corresponding to the defined type.

Roles are names given to the members of the named collaborative space which dictate access to the business component instances, i.e. the resources and tools, as well as to define the behavior of membership 14. Community role object 24 represents the valid specific roles set for a particular, i.e. specific, named collaborative space. For example, community roles within a named collaborative space instance relating to a virtual classroom might include teacher and student. Community role mapping object 26 provides a mapping from a specific community role represented by community role objects 24 to business component roles. For example, community role mapping object 26 may map the specific role of teacher within a virtual classroom to that of a moderator having certain access privileges and responsibilities for discussion forums.

Community role objects 24 include as elements a GUID, name, role ID and identification of the corresponding NCS via an NCS GUID. Community role mapping object 26 includes a GUID, name, a community role GUID and other elements which relate the community role mapping object 26 to business components. As such, the data model shown in FIG. 2 provides a framework by which NCS 10 can be presented showing the relationship between NCS object 17 and other objects used to create named collaborative spaces, store them and make them available to users.

Figure 3:
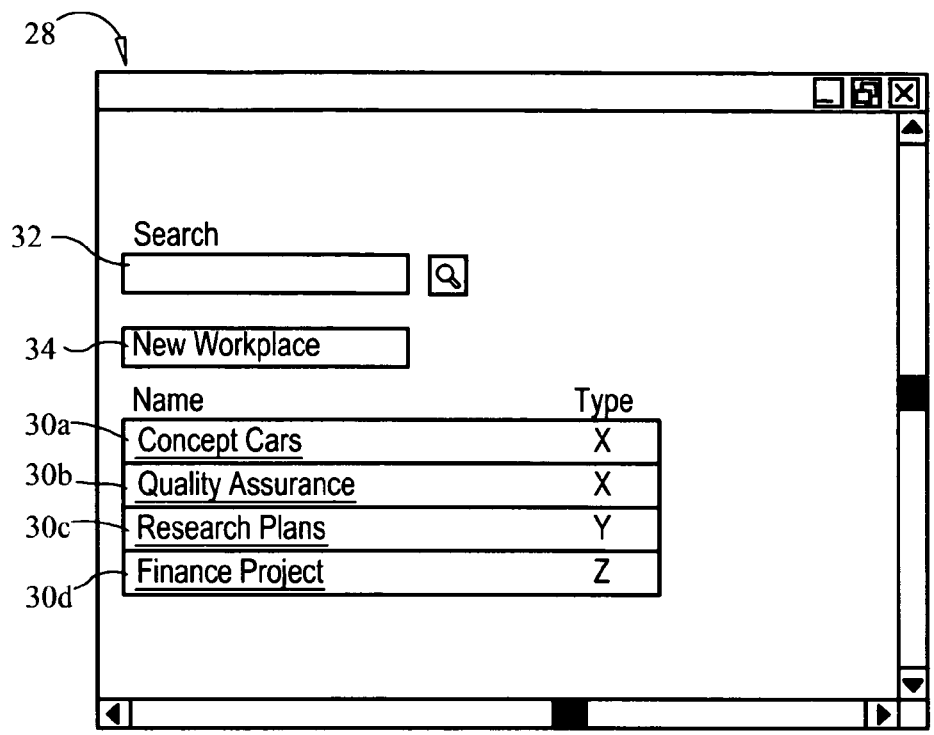
FIG. 3 is an exemplary screen display showing an arrangement of named collaborative space instances.

An example of an implementation of a named collaborative space 10 constructed in accordance with the principles of the present invention is explained with reference to FIGS. 3 and 4. FIG. 3 is an exemplary screen display showing an arrangement of named collaborative space instances. Instance summary screen display 28 includes named collaborative space instances 30a-d (referred to collectively herein as NCS instances 30), search area 32 and new work space creation button 34.

Each NCS instance 30 represents a specific instantiation of a business process. For example, the finance project NCS instance 30d, if selected by a user via an appropriate graphical user interface (GUI) pointing device or other known method of selection, opens a window such as that shown in FIG. 4 in which the window represents a specific NCS instance. Instance summary screen display 28 also shows the type, i.e. template, of NCS instance associated with each NCS instance 30. For example, the NCS type for finance project instance 30d is Z. As such, Z is the name of the template used to create the NCS instance 30d. Examples of types of NCS instances provided by IBM include TEAMSPACE and QUICKPLACE. As such, instance summary screen display 28 provides a user with a quick and easy way to determine NCS instances.

Because the present invention provides a provisionable and templatable arrangement for NCS 10, the present invention provides an easy way for users to create a new work place without the need to engage application developers and highly trained computer professionals to develop new instances. For example, by selecting new work space button 34, it is contemplated that a screen display is presented to the user showing all available templates from which the new work place can be created. The user selects an appropriate template which can be quickly and easily customized by the user and used to create the new work place. For example, the template can be created which provides the appearance of NCS instance 30d as shown in FIG. 4. In that manner, a user would be presented with a similar display which can then be customized to the user's satisfaction to provide the desired instance portlets and the like. This can be done through the use of a graphical user interface with the corresponding data being stored in the supporting computing device. Conversely, the user can designate an NCS instance such as that shown in FIG. 4 as a template so that future NCS instances can be implemented based on the template.

Instance summary screen display 28 also includes search area 32 which allows a user search for NCS instances. Techniques for implementing computer searches are known in the art and are not described herein.

Figure 4:
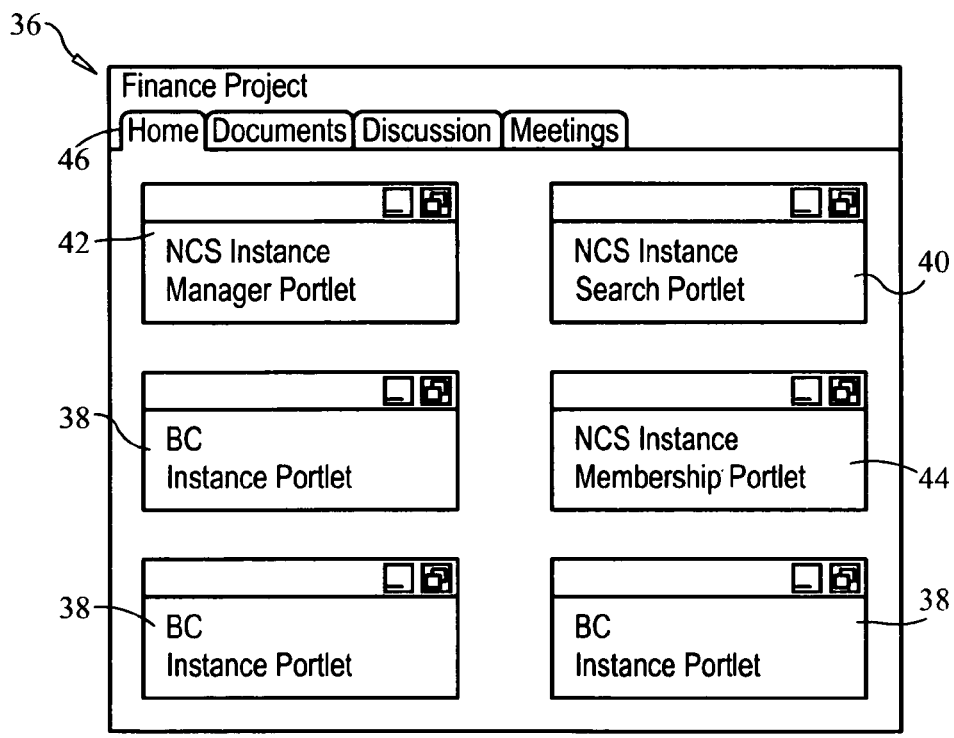
FIG. 4 is an exemplary screen display showing an arrangement of a named collaborative space instance.

FIG. 4 is an exemplary screen display showing an arrangement of named collaborative space instance 30d. Finance project instance 36 includes a plurality of business component (BC) instance portlets 38, NCS instance search portlet 40, NCS instance manager portlet 42, NCS instance membership portlet 44 and screen tabs 46. Business component instance portlets provide specific business component instances such as news, document libraries, discussion forums, stock quotes, etc. The NCS instance search portlet 40 is an application which allows users to search within the NCS instance and its business component instances. The result set is aggregated across the business component that implements the search interface. It is presumed that one of ordinary skill in the art can develop an appropriate search portlet.

NCS instance manager portlet 42 provides the name and metadata information about the NCS instance such as the description and intent of the NCS instance, general information, and the like. NCS instance manager portlet 42 also allows editing of the instance name and metadata, and provides the ability to remove an instance. NCS instance membership portlet 44 provides for the tracking and management of members within the NCS instance. It is contemplated that NCS instance membership portlet 44 can provide a mechanism for inviting new members, and managing existing members. It is presumed that one of ordinary skill in the art can develop and implement a membership portlet. Screen tabs 46 allow a user to interact with various categories of elements within the NCS instance such as documents, discussion groups, meeting schedulers, online meetings and the like. For example, selecting the documents tab may display a BC instance portlet 38 in the form of a document library.

Access control into an NCS instance as well as the application of permissions such as the ability to create, modify and delete NCS instances can be provided by the access control logic and processes within the collaborative computing environment such as those which are used to implement and enforce access and permission policy relating to community roles.

The present invention provides a system and method by which collaborative communities can be modeled such that, when implemented, result in an addressable and secure named space. NCS 10 aggregates business component instances and maps community roles to business component roles. Named collaborative spaces, as discussed above, are templatable, provisionable and searchable and provide a mechanism by which NCS instances can be created by user without the need for sophisticated programs, programming tools and highly skilled application developers. NCS 10 provides a framework which can be specialized to provide value to end users and also allows application developers, business component developers and end users to create specialized instances of an NCS 10.

The present invention can be realized in hardware, software, or a combination of hardware and software. For example, the membership set for the collaborative space, the data corresponding to the named spaces and the role data can be stored in a database. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A collaborative computing method for the establishment of a named collaborative space, the method comprising:

providing a templatable and provisionable named collaborative space configured to serve as a basis for establishing multiple different instances of named collaborative spaces, the templatable and provisionable named collaborative space defining a work place within the collaborative computing environment and configured to manage a plurality of business process components disposed within an instance of the named space in a one-to-many relationship;

provisioning multiple different instances of the templatable and provisionable named collaborative space, each of the instances of the named collaborative space representing a specific instantiation of a business process and also is associated with a type of instance, the type of instance being a named template;

identifying a membership set for the named collaborative space, the membership set including one or more members;

providing a plurality of business process component instances for management within each of the provisioned instances of the named collaborative space;

providing additional instance portlets including an instance search portlet configured for searching within each of the provisioned instances of the named collaborative space and also corresponding business process component instances, an instance manager portlet configured for providing a name and metadata for each of the provisioned instances of the named collaborative space, and an instance membership portlet configured for providing tracking and management of members within each of the provisioned instances of the named collaborative space; and, managing a common lifecycle for each of the provisioned instances of the named collaborative space and the business process components within each of the provisioned instances of the named collaborative space by instantiating the business process components within each of the provisioned instances of the name collaborative space when each of the provisioned instances of the name collaborative space is instantiated and by removing the business process components within each of the provisioned instances of the name collaborative space when each of the provisioned instances of the name collaborative space is removed.

2. The method of claim 1, wherein the business process component instances are business instance portlets.

3. The method of claim 2, further comprising transferring information between the business component instance and the named collaborative space, the information being transferred using an enterprise java bean.

4. The method of claim 1, wherein the members of membership set for the collaborative space are assigned a role, the role defining access and permission privileges to the at least one business process.

5. The method of claim 1, wherein the provisioned instance of the templatable and provisionable named collaborative space is provisionable from other provisioned instances of named collaborative spaces.

6. The method according to claim 1, further including assigning a policy to the named space.

7. A computer-readable storage device storing a computer program which when executed performs a method for establishing a collaborative computing named collaborative space, the method comprising:

providing a templatable and provisionable named collaborative space configured to serve as a basis for establishing multiple different instances of named collaborative spaces, the templatable and provisionable named collaborative space defining a work place within the collaborative computing environment and configured to manage a plurality of business process components disposed within an instance of the named space in a one-to-many relationship and also is associated with a type of instance, the type of instance being a named template;

provisioning multiple different instances of the templatable and provisionable named collaborative space, each of the instances of the named collaborative space representing a specific instantiation of a business process;

identifying a membership set for the named collaborative space, the membership set including one or more members;

providing a plurality of business process component instances for management within each of the provisioned instances of the named collaborative space;

providing additional instance portlets including an instance search portlet configured for searching within each of the provisioned instances of the named collaborative space and also corresponding business process component instances, an instance manager portlet configured for providing a name and metadata for each of the provisioned instances of the named collaborative space, and an instance membership portlet configured for providing tracking and management of members within each of the provisioned instances of the named collaborative space; and, managing a common lifecycle for each of the provisioned instances of the named collaborative space and the business process components within each of the provisioned instances of the named collaborative space by instantiating the business process components within each of the provisioned instances of the name collaborative space when each of the provisioned instances of the name collaborative space is instantiated and by removing the business process components within each of the provisioned instances of the name collaborative space when each of the provisioned instances of the name collaborative space is removed.

8. The computer-readable storage device of claim 7, wherein the business process component instances are business instance portlets.

9. The computer-readable storage device of claim 7, wherein the members of membership set for the collaborative space are assigned a role, the role defining access and permission privileges to the at least one business process.

10. The computer-readable storage device of claim 7, wherein the provisioned instance of the templatable and provisionable named collaborative space is provisionable from other provisioned instances of named collaborative spaces.

11. The computer-readable storage device of claim 8, wherein the method performed by the stored computer program when executed further includes transferring information between the business component instance and the named collaborative space, the information being transferred using an enterprise java bean.

12. The computer-readable storage device of claim 7, wherein the method performed by the stored computer program when executed further includes assigning a policy to the named space.

13. A system providing a named collaborative space in a collaborative computing environment, the system comprising a computer having:

a database, the database storing:
a membership set for a templatable and provisionable named collaborative space serving as a basis for the establishment of multiple different provisioned instances of the templatable and provisionable named collaborative space, the membership set identifying one or more members; and data corresponding to each of the provisioned instances of the templatable and provisionable named collaborative space defining a place within the collaborative computing environment; and central processing unit functioning to provide a plurality of sets of business process component instances: each of the sets of business process component instances being accessible within a corresponding one of the provisioned instances of the templatable and provisionable named collaborative space in a one-to-many relationship between the sets of business process component instances and a corresponding one of the provisioned instances of the templatable and provisionable named collaborative spaces, the corresponding one of the provisioned instances of the templatable and provisionable named collaborative spaces further being associated with a type of instance, the type of instance being a named template, to provide additional instance portlets including an instance search portlet configured for searching within each of the provisioned instances of the named collaborative space and also corresponding business process component instances, an instance manager portlet configured for providing a name and metadata for each of the provisioned instances of the named collaborative space, and an instance membership portlet configured for providing tracking and management of members within each of the provisioned instances of the named collaborative space, to instantiate the sets of business process component instances and also the additional instance portlets when the corresponding one of the provisioned instances of the templatable and provisionable named collaborative spaces is instantiated, and to remove the sets of business process component instances when the corresponding one of the provisioned instances of the templatable and provisionable named collaborative spaces is removed, the central processing unit in operative communication with the database.

14. The system of claim 13, wherein the at least one business process is a business instance portlet.

15. The system of claim 13, wherein the database further stores role data, members of membership set for the collaborative space being assigned a role based on corresponding role data, the role data defining access and permission privileges to the at least one business process.

16. The system of claim 13, wherein the instance of the templatable and provisionable named collaborative space is provisionable from other provisioned instances of named collaborative spaces.

* * * * *

UNITED STATES PATENT AND TRADEMARK OFFICE
CERTIFICATE OF CORRECTION

PATENT NO.        : 8,825,906 B2                                        Page 1 of 1
APPLICATION NO.   : 10/734348
DATED             : September 2, 2014
INVENTOR(S)       : Banatwala et al.

It is certified that error appears in the above-identified patent and that said Letters Patent is hereby corrected as shown below:

Title page (*) Notice: Insert the following, --This patent is subject to a Terminal Disclaimer--.

Signed and Sealed this
Twenty-first Day of July, 2015

Michelle K. Lee
*Director of the United States Patent and Trademark Office*